United States Patent [19]

Roberts

[11] Patent Number: 4,919,360
[45] Date of Patent: Apr. 24, 1990

[54] CLUTCH MECHANISM FOR BAIT CASTING FISHING REEL

[75] Inventor: Dennis E. Roberts, Owasso, Okla.

[73] Assignee: Zebco, Corporation, Tulsa, Okla.

[21] Appl. No.: 222,572

[22] Filed: Jul. 21, 1988

[51] Int. Cl.[5] .......................................... A01K 89/015
[52] U.S. Cl. ....................................... 242/260; 242/261
[58] Field of Search ............... 242/211, 217, 218, 219, 242/220, 221, 260, 261

[56] References Cited

U.S. PATENT DOCUMENTS

| | | | |
|---|---|---|---|
| 4,548,370 | 10/1985 | Noda | 242/218 X |
| 4,575,024 | 3/1986 | Kaneko | 242/218 |
| 4,593,869 | 6/1986 | Yasui | 242/220 |
| 4,697,760 | 10/1987 | Aoki | 242/220 |
| 4,768,735 | 9/1988 | Aoki | 242/220 |

FOREIGN PATENT DOCUMENTS

| | | | |
|---|---|---|---|
| 55370 | 4/1985 | Japan | 242/220 |
| 78526 | 5/1985 | Japan | 242/220 |

Primary Examiner—Joseph J. Hail, III
Attorney, Agent, or Firm—Wood, Phillips, Mason, Recktenwald & Vansanten

[57] ABSTRACT

A fishing reel includes a housing rotatably mounting a spool. A clutch is mounted on the housing for generally linear movement to effect free rotation of the spool. An actuator member is mounted on the housing for manual engagement and for linear movement oblique to the linear movement of the clutch. A bell crank is connected by lost motion means between the clutch and the actuator for linearly moving the clutch in response to linear movement of the actuator.

2 Claims, 3 Drawing Sheets

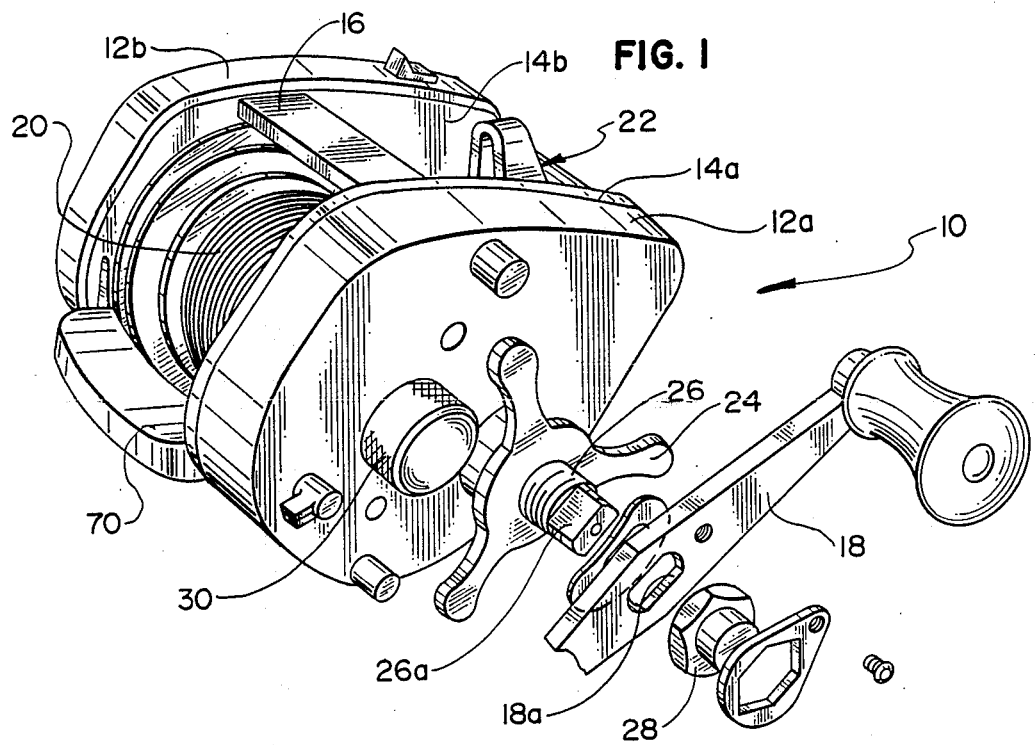
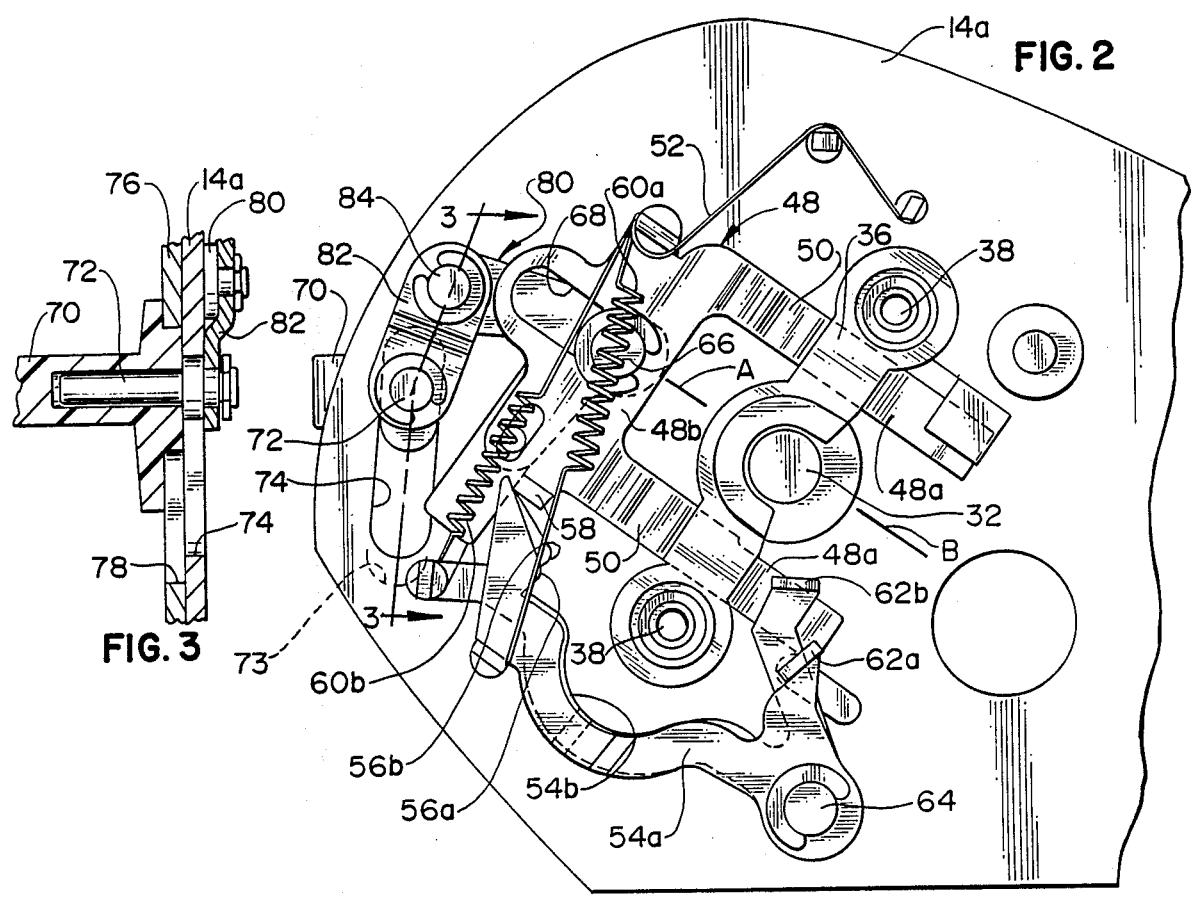

4,919,360

CLUTCH MECHANISM FOR BAIT CASTING FISHING REEL

FIELD OF THE INVENTION

This invention generally relates to fishing reels of the casting type and, particularly, to a clutch trip mechanism for casting fishing reels.

BACKGROUND OF THE INVENTION

Casting type fishing reels normally include a spool having a spool axis extending in a transverse direction normal to the fishing line and the casting rod. A frame is disposed about the area of the spool shaft and normally includes a pair of side frame members or plates having spacer posts extending transversely therebetween. One or more side covers are positioned about the outside of the side frame plates and house operative components of the reel such as a gear train, drag mechanism, anti-reverse mechanism, clutch mechanism and the like. A handle is disposed on the outside of one of the side covers, normally the right side cover, and is connected through a crank shaft assembly to the gear train. A level wind mechanism conventionally is provided for traversing the spool during winding of the fishing line thereon.

Casting reels generally have more operative components on the inside thereof, and one of these components often is a trip clutch mechanism which releases the spool so that the spool can rotate freely for casting. Most such mechanisms use a thumb button or thumb bar on the outside of the reel for tripping the interior clutch mechanism. The thumb button or bar is operatively associated with some type of actuator means which either pivots or moves in an arcuate path to actuate the mechanism. This invention is directed to an improved trip clutch mechanism of the character described which operates in a generally linear path to afford more free movement.

SUMMARY OF THE INVENTION

An object, therefore, of the invention is to provide a new and improved clutch actuating mechanism for fishing reels of the casting type.

In the exemplary embodiment of the invention, the fishing reel includes a housing having side frame members, with a spool having a transverse spool shaft extending between the side frame members. Pinion gear means is slidably mounted on the spool shaft for movement between a first position for rotating the spool shaft and a second position for rotating free of the spool shaft. Clutch means are mounted on the housing for generally linear movement perpendicular to the spool shaft for moving the pinion gear between its positions. Actuator means, including a thumb bar exposed exteriorly of the housing, are provided for manual engagement. The actuator means is mounted on the housing for generally linear movement oblique to the linear movement of the clutch means.

Generally, the invention contemplates motion transmitting means operatively associated between the clutch means and the actuator means for linearly moving the clutch means and axially moving the pinion gear from its first position to its second position in response to linear movement of the actuator means.

More particularly, the motion transmitting means is disclosed herein as cam lever means in the form of a bell crank having first and second angularly oriented legs. The bell crank is pivotally mounted on the housing at the juncture of the legs, with the first leg operatively associated pivotally with the actuator means and the second leg operatively associated pivotally with the clutch means.

Lost motion means in the form of a link arm is pivotally connected at opposite ends between the first leg and the actuator means. Lost motion means in the form of a pin-and-slot means are provided between the second leg and the clutch means. Therefore, linear movement of the actuator means is transmitted to oblique linear movement of the clutch means.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 1 is a perspective view of a casting type fishing reel in accordance with the invention, with an exploded presentation of the components of the handle means;

FIG. 2 is an isolated elevational view, on an enlarged scale, illustrating the disengaged positions of the clutch means and the actuator means therefore;

FIG. 3 is fragmented section taken generally along line 3—3 of FIG. 2;

DETAILED DESCRIPTION OF THE PREFERRED EMBODIMENT

Figure 4:
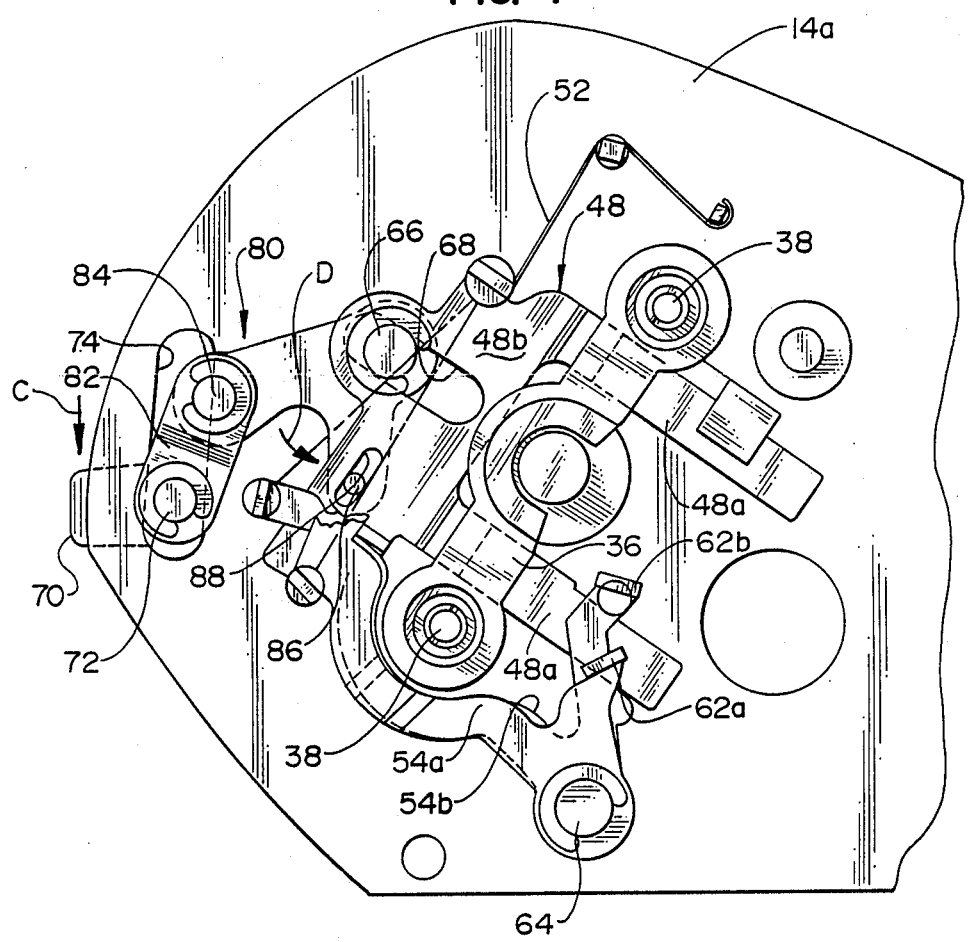
FIG. 4 is a view similar to that of FIG. 2, with the clutch mechanism and actuator means in engaged positions.
Figure 5:
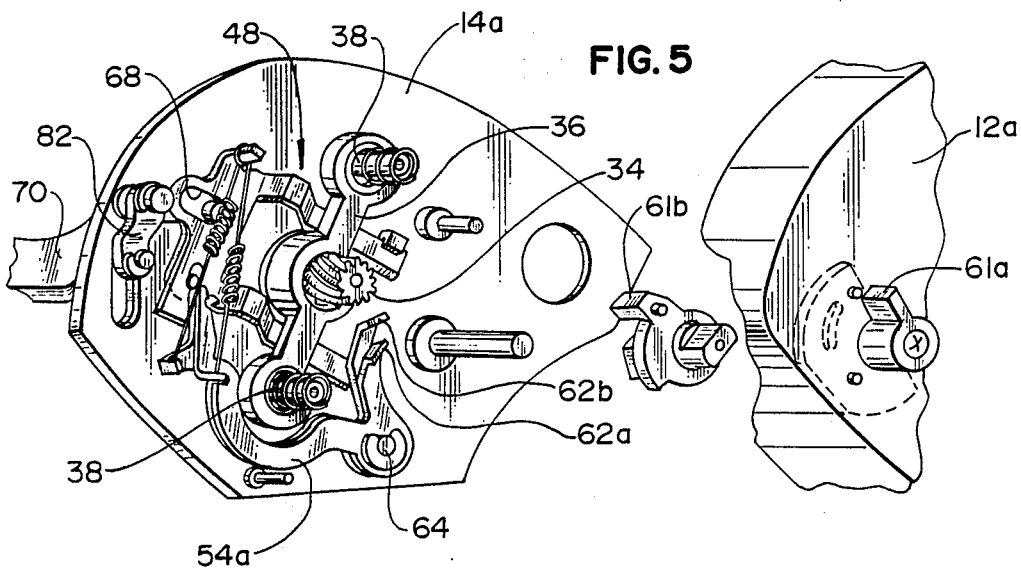
FIG. 5 is a perspective view of the clutch mechanism and actuator means in disengaged positions.
Figure 6:
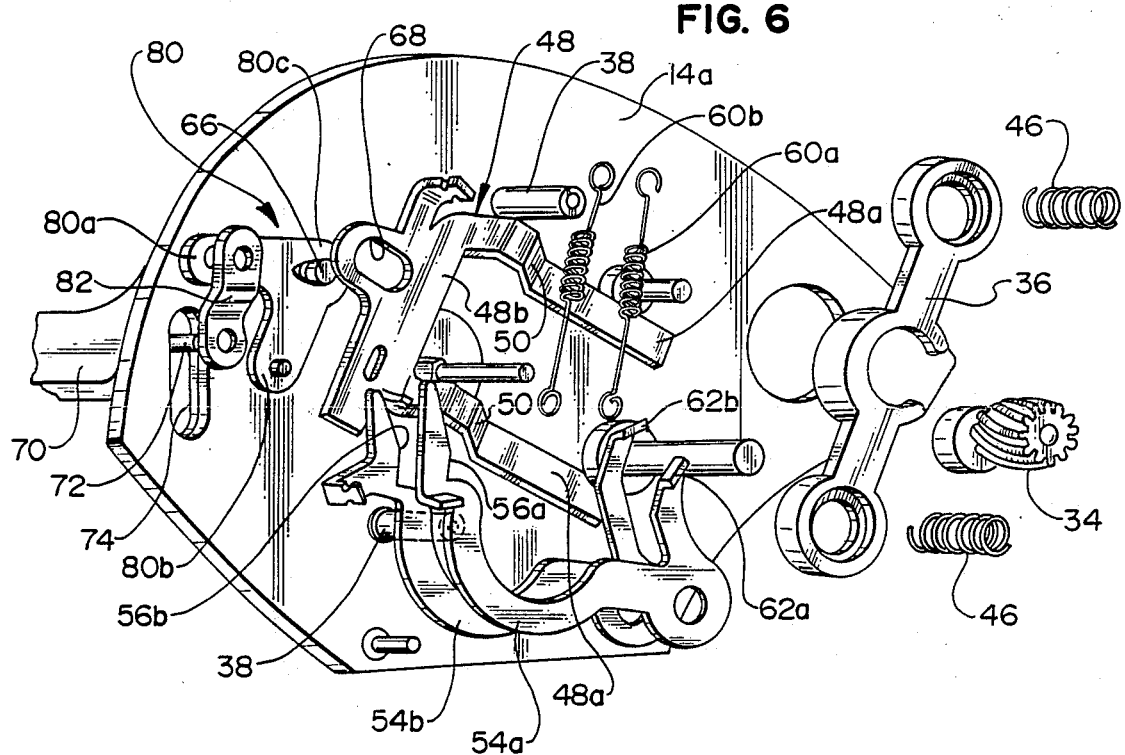
FIG. 6 is an exploded perspective view, on an enlarged scale, of the clutch mechanism and actuator means.

Referring to the drawings in greater detail, and first to FIG. 1, a casting type fishing reel is shown and generally designated 10. The reel includes a housing defined by a pair of side cover members 12a and 12b. The housing includes a pair of side frame members 14a and 14b with a plurality of spacer posts 16 (only one of which is visible in the FIG.) extending transversely therebetween. A handle 18 is rotatably mounted on the outside of cover 12a for rotating a spool 20 to retrieve fishing line, as is conventional. A level wind mechanism, generally designated 22, is provided for traversing spool 20 during winding the fishing line thereon. A conventional star wheel 24 is threaded onto a crank shaft 26, the star wheel being operatively associated with a drag mechanism of the reel. Handle 18 includes a rectangular hole 18a which is shaped complementary to a rectangularly shaped distal end 26a of crank shaft 26 for rotating the crank shaft and, therefore, the spool and other operative components of the reel. The distal end of the crank shaft is externally threaded for receiving a nut 28 for securing the handle to the distal end of the crank shaft. A cup-shaped hub bearing cap 30 is shown exteriorly of side cover 12a and positioned as described below.

Figure 7:
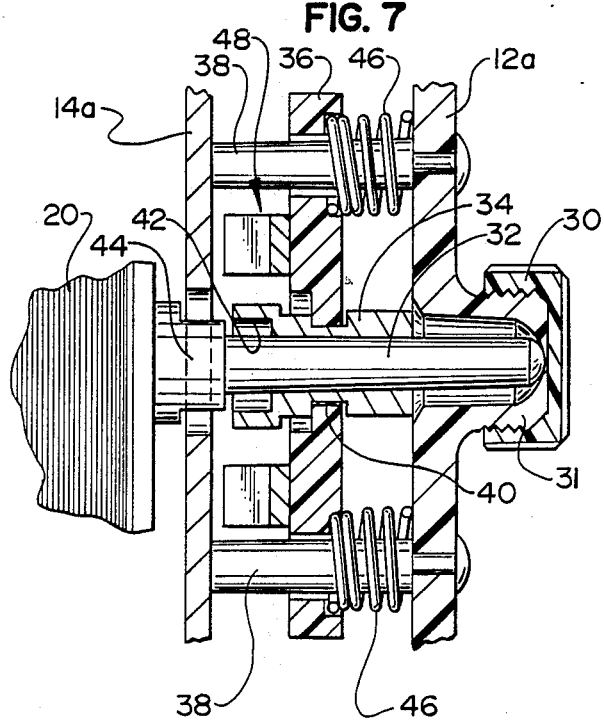
FIG. 7 is a fragmented section, on an enlarged scale, depicting the disengaged position of the pinion gear and the associated components of the clutch mechanism.
Figure 8:
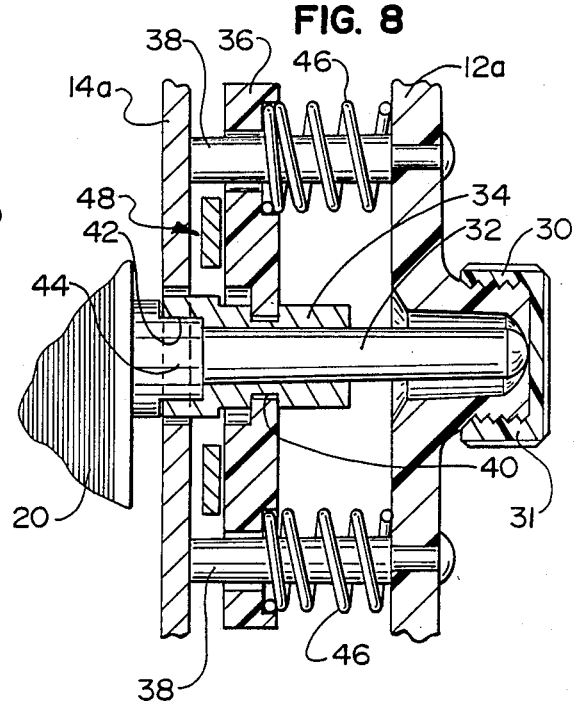
FIG. 8 is a view similar to that of FIG. 7, with the pinion gear and clutch components in engaged positions.

FIGS. 7 and 8 show hub bearing cap 30 threaded onto a boss 31 of cover 12a for receiving and providing a pilot for a spool shaft 32 of spool 20. Generally, clutch means are provided for selective actuation to disengage a spool pinion gear 34 from spool shaft 32 to permit the spool to free-wheel during casting, and to automatically reengage the pinion gear with the spool shaft immediately in response to initial rotation of handle 18 to retrieve the fishing line. More particularly, a carrier plate 36 is mounted on a pair of posts 38 formed integrally with or projecting axially from side plate 14a, whereby the carrier plate is movable generally parallel to spool shaft 32. Carrier plate 36 seats within an annular recess 40 in pinion gear 34 for axially moving the gear with the carrier plate.

FIG. 7 shows pinion gear 34 in its disengaged position and FIG. 8 shows the pinion gear in its axial position of engagement with the spool. To this end, pinion gear 34 has an irregularly shaped socket 42 which meets with a complimentarily irregularly shaped enlarged portion 44 of spool shaft 32 to drive the spool shaft. When in disengaged position, spool 20 is free to rotate for casting purposes. A pair of coil springs 46 are sandwiched between carrier plate 36 and right-hand cover 12a to bias the carrier plate and pinion gear 34 automatically back to the position of engagement of the pinion gear. The structure and function of pinion gear 34, carrier plate 36, etc., generally are known in the art. The carrier plate and pinion gear are movable axially of spool shaft 32 by a clutch plate, generally designated 48.

Referring back to FIGS. 2-6, details of the clutch means and actuator means now will be described. With the description of FIGS. 7 and 8, the position of pinion gear 34 and carrier plate 36 in relation to the clutch mechanism are illustrated and their function and operation now can be better understood. In addition, the positions of the components of the clutch means with the pinion gear in engaged condition are shown in FIGS. 2, 3, 5 and 6. The position of the components of the clutch mechanism with the pinion gear and carrier plate in disengaged or free casting condition are shown in FIG. 4.

More particularly, clutch plate 48 is generally U-shaped and is slidably mounted on frame plate 14a for generally linear movement perpendicular to spool shaft 32 in the direction of double-headed arrow "A" (FIG. 2). The U-shaped clutch plate has a pair of legs 48a joined by a cross or bight portion 48b. The legs underlie carrier plate 36. Each leg of the clutch plate has an inclined cam ramp portion 50 which, upon movement in the direction of arrow "B" (FIG. 2) are effective to "lift" the carrier plate and disengage the pinion gear from the spool shaft as described in relation to FIGS. 7 and 8. In other words, when clutch plate 48 is moved from the position shown in FIG. 2 to the position shown in FIG. 4, the spool is conditioned for free rotation for casting purposes.

A spring 52 (FIGS. 2 and 4) normally biases clutch plate 48 toward its disengaged condition. Upper and lower latch devices 54a and 54b, respectively, have shoulders 56a and 56b, respectively, which seat behind a latch post 58 projecting from clutch plate 48. These latch devices are biased by springs 60a and 60b, respectively, toward latching condition such that shoulders 56a, 56b are held behind latch post 58 until released. After a cast by a fisherman, upon initial rotation of handle 18 and crankshaft 26, ratchet means 61a and 61b on the crankshaft will engage release tongues 62a and 62b, respectively, of latch devices 54a and 54b, respectively, to pivot the latch devices about pivot pin 64 and move shoulders 56a, 56b from out of engagement with latch post 58 of clutch plate 48. Thereupon, spring 52 will move the clutch plate back opposite the direction of arrow "B". Linear movement of the clutch plate is guided by a post 66 projecting from frame plate 14a and into an elongated slot 68 in the clutch plate, the elongated slot extending generally in the direction of linear movement of the clutch plate (i.e. arrows "A" and "B"). The general operation of such a U-shaped clutch plate is known.

Actuator means, including a thumb button or bar 70 exposed exteriorly of the reel, are provided for effecting linear movement of clutch plate 48. The actuator means itself is mounted on the reel housing for generally linear movement oblique to the linear movement of the clutch plate.

More particularly, as seen in FIG. 3, thumb bar 70 has a pin 72 which extends through an elongated slot 74 in side frame plate 14a. Actually, as shown in FIG. 3, side frame plate 14a is covered by an inner covering plate 76 also having an elongated slot 78 through which pin 72 extends. As shown in FIGS. 2 and 4, slot 74 (and slot 76) define a linear path of travel for thumb bar 70 as indicated by arrow "C" (FIG. 4). This linear path of travel is oblique to that of clutch plate 48 as indicated by arrows "A" and "B" in FIG. 2. Movement of the thumb bar is effected simply by a fisherman pushing down on the bar with his thumb in the direction of arrow "C". Contrary to prior arcuately movable thumb buttons or bars, or bars which are pivotally mounted, this linear movement gives considerable ease of operation.

Generally, motion transmitting means are provided operatively associated between the actuator means, including thumb bar 70, and the clutch means, including clutch plate 48, for linearly moving the clutch plate and the pinion gear 34 in response to linear movement of the actuator means. More particularly, cam lever means in the form of a bell crank, generally designated 80, is connected by lost motion means between the actuator means and the clutch means. The configuration of bell crank 80 can best be seen in FIG. 4 and the perspective view of FIG. 6. The bell crank includes first and second legs 80a and 80b, respectively, meeting at a juncture 80c. The bell crank is pivoted on post 66 which projects through elongated slot 68 in clutch plate 48. Leg 80a is operatively associated with the actuator means and leg 80b is operatively associated with the clutch means.

Specifically, the lost motion means between leg 80a of bell crank 80 and thumb bar 70 comprises a link arm 82 pivotally connected at one end to pin 72 and pivotally connected at its opposite end to the distal end of leg 80a by a pin 84.

The lost motion means between bell crank 80 and clutch plate 48 comprises a pin-and-slot construction including a pin 86 projecting from the distal end of leg 80b of the bell crank into a lost motion, elongated slot 88 in bight portion 48b of clutch plate 48.

that once ends 64 dock within ports 66, actuator 63 and gripper 65 are properly located over the desired operational task position. The XY table positioning system can be implemented by those skilled in the art in any one of numerous ways. For example, the illustrated embodiment includes a first and second pair of parallel linear guideways 80a and 80b, respectively. The second pair of guideways 80b is arranged substantially perpendicular to the first pair 80a and is mounted thereto via a first pair of linear bearings 82 such as to be capable of traversing the first pair of guideways. A second pair of linear bearings 84 allows for translation of lower fixture plate 68 relative to the second pair of linear guideways 80b. A first drive means comprising a stepper motor or servomotor 86a, a lead screw or ball screw 88a and a ball nut 90a controls movement of the top assembly along the first pair of guideways. Motor 86a is connected to the base structure 92 by a motor mount 94a.

A second identical drive means, mounted to travel along the first pair of parallel linear guideways 80a, directs movement of the lower fixture plate 68 along the second pair of linear guideways. Namely, a second stepper motor or servomotor 86b drives a second ball nut 90b along a second lead screw or ball screw 88b. Motor 90b is connected to the lower drive assembly by a mount 94b.

The speed of the XY table positioning system must be such that lower fixture plate 68 is at the desired location before the manipulator arm is ready to dock thereto by means of the positioning legs. This is not believed problematic since the XY table system need not move the lower fixture plate a large displacement per cycle compared to the displacement of the robotic manipulator.

Still another embodiment of the invention is illustrated in FIGS. 8-10. This embodiment is utilized when performing a desired operational task utilizing two (or more) robotic manipulators 98a and 98b. The system allows for some of the typical coordinated robot manipulator control problems to be eliminated through creation of a mechanical closed loop reference frame. A first wrist assembly 100a attaches to manipulator arm 98a by mounting plate 102a, which again is affixed thereto by any common means. A compliant coupling 104a connects plate 102a to an upper fixture plate 106 which has three legs 108 depending therefrom. The free ends 110 of each leg 108 have female conical-shaped receptacles or ports 112 therein. Similarly, second wrist assembly 100b is mounted robotic manipulator 98b by mounting plate 102b. Compliant coupling 104b connects mounting plate 102b with a lower fixture plate 114 which also has three positioning legs 116 affixed thereto. Legs 116 each have a male conical-shaped free end 118. Ends 118 are positioned and configured to engagably mate with the conical-shaped ports 112 when robotic manipulators 98a and 98b reach their programmed target coordinates, thereby forming a closed loop reference frame. As with the other embodiments, such a closed loop reference frame separates operation of a first end effector 120 connected to the upper fixture plate and a second end effector 122 connected to the lower fixture plate from inaccuracies or vibrations of the robotic manipulators 98a and 98b. End effectors 120 & 122 may be of similar or different construction depending upon the task to be performed. Also, other robotic manipulators can be docked in a similar manner if one or both of the fixture plates have additional male/female conical shaped locating means to accomodate such multiple dockings.

An alternate version of the two robotic manipulator docking embodiment of the invention is illustrated in FIGS. 9 & 10. In this version, the upper fixture plate and its depending legs have been replaced by a first cylindrical fixture plate 130 which has a male configured edge 131 at its free end 132. A corresponding second cylindrical shaped fixture plate 134, having a female receptacle or port 135 at its free end 136, replaces the lower fixture plate with its depending legs of FIG. 8 embodiment. A rotational orientation pin 138 docks to a rotation receptacle 139 to ensure a correct degree of rotation.

Although several embodiments of the mechanical closed loop system of the present invention have been illustrated in the accompanying drawings and described in the foregoing detailed description, it will be understood that the invention is not limited to the particular embodiments described herein but is capable of numerous rearrangements, modifications and substitutions without departing from the scope of the invention. For example, the male conical leg ends and corresponding female conical ports can be alternatively located on the upper and lower fixture plates as desired. In addition, other geometric configurations besides the discussed conical, flat and wedge shaped surfaces may be utilized. Other changes will suggest themselves to those skilled in the art. The following claims are intended to encompass all such modifications.

I claim:

1. A mechanical closed loop system for translationally locating along X, Y, Z axes and rotationally locating about each of said X, Y, Z axes the distal end of a robotic arm relative to a workpiece fixture, the distal robotic arm end having an independently operated micro-robotic manipulator affixed thereto for performance of high precision tasks on a workpiece positioned on said fixture, said system comprising:
   a wrist assembly mountable to the robotic arm, said assembly having a compliant member and a first positioning member connected to the compliant member, said first positioning member including a first docking means;
   a second positioning member associated with the workpiece fixture, said second positioning member including a second docking means;
   said first docking means and said second docking means comprising:
   (i) a first positioning leg connected to one of said first positioning member and said second positioning member and a first positioning port associated with the other of said first positioning member and said second positioning member, said first positioning port having a tapered lead in configured to engagably receive and position said first positioning legs free end as the robotic arm attains a target position relative to the workpiece fixture;
   (ii) a second positioning leg connected to one of said first positioning member and said second positioning member and a second positioning port associated the other of said first positioning member and said second positioning member, said second positioning port having a tapered lead in configured to engagably receive and position said second positioning leg's free end as the robotic arm attains its target position relative to the workpiece fixture;